(No Model.)
E. P. ROBERTS.
DEVICE FOR DISPOSING OF SURPLUS WATER IMPOUNDED IN RESERVOIRS.
No. 447,083. Patented Feb. 24, 1891.
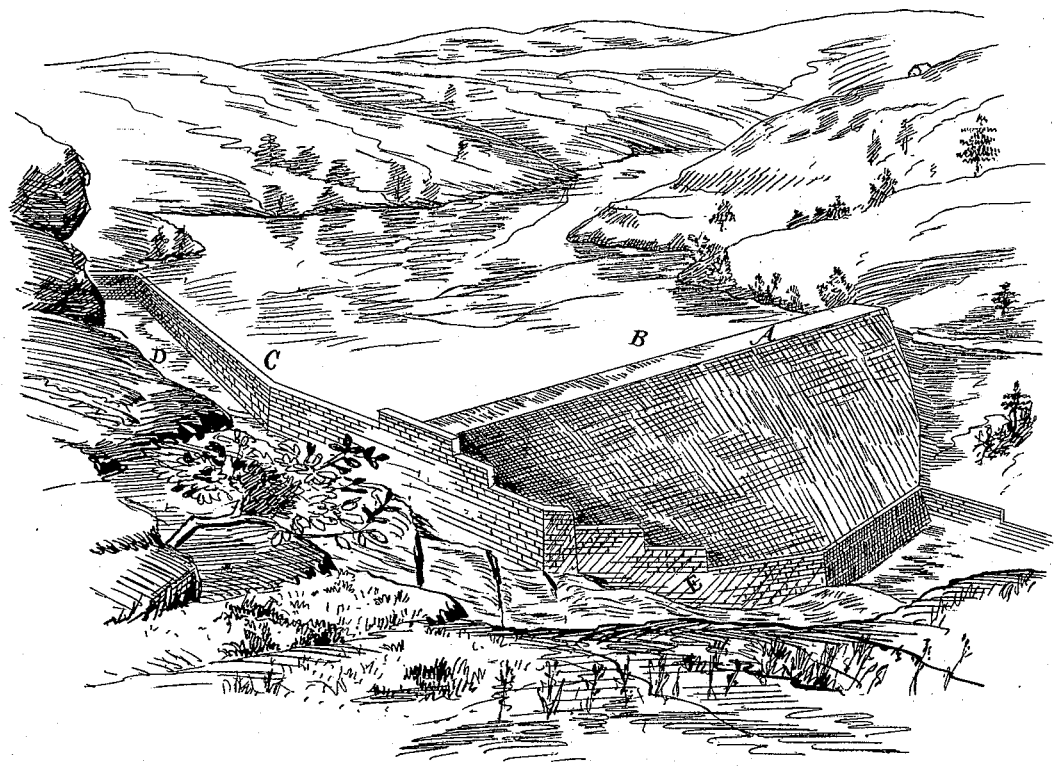
Witnesses
H. Coutant
Wm. A. Pollock
Inventor
Evelyn Pierrepont Roberts,
By his Attorney:
E N Dickerson

United States Patent Office.

EVELYN PIERREPONT ROBERTS, OF SING SING, NEW YORK.

DEVICE FOR DISPOSING OF SURPLUS WATER IMPOUNDED IN RESERVOIRS.

SPECIFICATION forming part of Letters Patent No. 447,083, dated February 24, 1891.

Application filed November 8, 1890. Serial No. 370,781. (No model.)

*To all whom it may concern:*

Be it known that I, EVELYN PIERREPONT ROBERTS, of the village of Sing Sing, county of Westchester, and State of New York, have invented a new and useful Improvement in Device for Disposing of Surplus and Flood Waters Impounded in Reservoirs, of which the following is a full, true, and exact description, reference being had to the accompanying drawings.

In the ordinary practice of retaining water in reservoirs behind dams it is customary to provide an overflow over the lip of the main dam either on its entire length or over some portion thereof. This structure requires the formation of a dam with specially provided apron or space upon the lower face of the dam, thus involving a large and unnecessary expense in comparison with the structure of the present specification.

By the invention herein described I provide a transverse structure or retaining-dam, the function of which is simply to retain the water behind it, which water does not flow over its lip; and I provide an independent structure at one or both ends of the main dam and extending at an angle and preferably at or about right angles to the main dam, the function of which is to allow the water to escape or flow over its lip, and which structure I have denominated a "side spillway." Extending along the outer face of this lateral structure I provide a suitable channel for the escape of the water below the main dam itself, and I preferably protect that portion of the main dam around which the water flows with a suitable casing of masonry.

My invention will be readily understood from the accompanying drawing, which represents a general perspective of my invention.

A represents a dam, which may be of any ordinary or well-known construction; B, the body of retained water; C, the side spillway, over which the surplus waters fall, and D the channel or trough, through which the escaped water may flow.

As may be seen, the lower part of the main dam, as at E, is protected with a suitable facing of masonry or other material to protect that portion of the dam proper from the action of the discharged waters.

In addition to the advantage in economy and construction to which I have referred, there is another advantage, which is principally noticeable where it is desirable to confine a large flow of water by means of a dam at a narrow point in a valley where the width would not be sufficient to furnish a sufficient overflow for the surplus waters. By this invention a spillway of any length may be secured, and thereby the danger of the dam being carried away by overflow is positively obviated.

Another advantage in the present structure is that it can be arranged with a main dam of any desired height above the level of the overflow or side spill-lip. It results from this that in case of the coming of any sudden and large volume of water such water may be retained behind the main dam, escaping only over the side spill, and thus gradually relieving itself and preventing injurious effects below the dam.

What I claim as my invention, and desire to secure by Letters Patent, is—

The combination of a main dam extending transversely across a valley, with a side spill connected therewith and extending up the valley at an angle to the main dam, and having an overflow-lip below the level of the top of the main dam, the said side spill being provided with a lateral channel for the escape of the water delivering below the main dam, substantially as described.

In testimony whereof I have signed my name to this specification in the presence of two subscribing witnesses.

EVELYN PIERREPONT ROBERTS.

Witnesses:
WILLIAM A. POLLOCK,
D. N. MAXON.